US009495023B2

(12) United States Patent
Xu

(10) Patent No.: US 9,495,023 B2
(45) Date of Patent: Nov. 15, 2016

(54) INFORMATION PROCESSING METHOD AND ELECTRONIC DEVICE

(71) Applicants: Beijing Lenovo Software Ltd., Haidian District, Beijing (CN); Lenovo (Beijing) Co., Ltd., Beijing (CN)

(72) Inventor: Bo Xu, Beijing (CN)

(73) Assignees: BEIJING LENOVO SOFTWARE LTD, Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 319 days.

(21) Appl. No.: 14/084,772

(22) Filed: Nov. 20, 2013

(65) Prior Publication Data
US 2014/0139497 A1 May 22, 2014

(30) Foreign Application Priority Data

Nov. 20, 2012 (CN) .......................... 2012 1 0473412

(51) Int. Cl.
*G06F 3/0354* (2013.01)
*G06F 3/0362* (2013.01)
*G06F 3/0346* (2013.01)

(52) U.S. Cl.
CPC ......... *G06F 3/03545* (2013.01); *G06F 3/0346* (2013.01); *G06F 3/0362* (2013.01)

(58) Field of Classification Search
CPC ............. G06F 3/0346; G06F 3/03545; G06F 3/0362; G01C 22/00; G01C 22/02
USPC .................................................. 345/156–184
See application file for complete search history.

(56) References Cited

U.S. PATENT DOCUMENTS

| 6,326,956 | B1 * | 12/2001 | Jaeger | G06F 3/0317 178/19.05 |
| 8,490,013 | B2 | 7/2013 | Um | |
| 9,323,349 | B2 | 4/2016 | Huang | |
| 2004/0101297 | A1 * | 5/2004 | Nonaka | G03B 17/24 396/310 |
| 2004/0135765 | A1 * | 7/2004 | Kinerk | G06F 1/1626 345/156 |
| 2010/0214216 | A1 * | 8/2010 | Nasiri | A63F 13/06 345/158 |
| 2010/0333215 | A1 * | 12/2010 | Wang | G06F 1/1626 726/34 |

(Continued)

FOREIGN PATENT DOCUMENTS

| CN | 101989145 | 3/2011 |
| CN | 202142017 U | 2/2012 |
| CN | 202177871 U | 3/2012 |

OTHER PUBLICATIONS

First Office Action dated Apr. 26, 2016 out of Chinese priority Application No. 201210473412.8 (15 pages including English translation).

*Primary Examiner* — Dmitriy Bolotin
(74) *Attorney, Agent, or Firm* — Brinks Gilson & Lione; G. Peter Nichols

(57) ABSTRACT

An information processing method and an electronic device are described. The information processing method is applied in a first electronic device which can perform data transmission with a second electronic device. The first electronic device includes a first detecting unit. The method includes acquiring a first rotation information through detecting the rotation of the first electronic device by the first detecting unit; determining the first control instruction corresponding to the first rotation information based on the relationship between the preset rotation information and the control instruction, wherein the first control instruction is provided to the second electronic device to be executed.

23 Claims, 4 Drawing Sheets

(56) References Cited

U.S. PATENT DOCUMENTS

| | | | |
|---|---|---|---|
| 2011/0029917 A1 | 2/2011 | Um | |
| 2012/0026001 A1* | 2/2012 | Huang | H04M 1/67 340/689 |
| 2012/0057291 A1* | 3/2012 | Huang | G06F 1/1626 361/679.26 |
| 2012/0331546 A1* | 12/2012 | Falkenburg | G06F 3/03545 726/16 |
| 2013/0057496 A1* | 3/2013 | Hong | G06F 3/0488 345/173 |
| 2013/0088465 A1* | 4/2013 | Geller | G06F 3/03545 345/179 |
| 2013/0106777 A1* | 5/2013 | Yilmaz | G06F 3/03545 345/174 |
| 2013/0321263 A1* | 12/2013 | Ho | G06F 3/03 345/156 |
| 2013/0321360 A1 | 12/2013 | Huang | |
| 2014/0015812 A1* | 1/2014 | Peralta | G06F 3/03545 345/179 |
| 2014/0022218 A1* | 1/2014 | Parekh | G06F 3/038 345/179 |
| 2014/0092069 A1* | 4/2014 | Bentov | G06F 1/26 345/179 |
| 2014/0143737 A1* | 5/2014 | Mistry | G06F 3/0488 715/854 |
| 2014/0253461 A1* | 9/2014 | Hicks | G06F 1/3215 345/173 |

* cited by examiner

INFORMATION PROCESSING METHOD AND ELECTRONIC DEVICE

BACKGROUND

This application claims priority to Chinese patent application No. 201210473412.8 filed on Nov. 20, 2012, the entire contents of which are incorporated herein by reference.

The present invention relates to the field of electronic technology, in particular, relates to an information processing method and an electronic device.

With the development of the computer technology, more and more electronic devices such as a tablet computer, a smart phone and a palm computer are widely used in people's life, and the user can operate these devices by using a stylus; in the case of a WII game machine, the user can play a game via a gamepad.

Currently, taking a tablet computer for example, when the user wants to perform an operation (such as unlocking) on the tablet computer, the user has to touch an unlock icon displayed on the touch screen via a stylus, a finger or any other operation body, and the electronic device will detect the current position of the stylus as so to realize that the user touches the unlock icon at this time, and will further detect that the user slides the unlock icon by using the stylus. Thus, the electronic device will understand that the user wants to unlock the electronic device, and then it will generate a control instruction for unlock and control the electronic device to be unlocked in response to the instruction.

In the process of implementing the technical solution of the embodiments of the present invention by the applicant, the above-mentioned is found to possess the technical problems as follows:

Since the stylus can only operate the electronic device in a point touch manner, the user has to make the stylus to touch the touch screen in order to operate the electronic device, and the operation cannot be performed in the manner of an air gesture control, that is, there exists the technical problem that the stylus cannot operate the electronic device via other operation manner.

SUMMARY

The present invention provides an information processing method and an electronic device for addressing the technical problem of the prior art that the stylus cannot operate the electronic device via other operation manner.

In one aspect, according to an embodiment of the preset application, there is provided an information processing method applied in a first electronic device which can perform a data transmission with a second electronic device, the method comprises: acquiring a first rotation information through detecting the rotation of the first electronic device by the first detecting unit; determining the first control instruction corresponding to the first rotation information based on the relationship between the preset rotation information and the control instruction, wherein the first control instruction is provided to the second electronic device to be executed.

Preferably, the first electronic device further comprises a first switch unit for controlling the first detecting unit to be an enabled state.

Preferably, before acquiring a first rotation information through detecting the rotation of the first electronic device by the first detecting unit, the method comprises: generating a second control instruction when the first switch unit controls the first detecting unit to be an enabled state, wherein the second control instruction is used to control the first detecting unit to detect the rotation of the electronic device.

Preferably, determining the first control instruction corresponding to the first rotation information specifically comprises: reading the instruction list stored in the first electronic device; acquiring the first control instruction corresponding to the first rotation information based on the instruction list; sending the first control instruction to the second electronic device so that the second electronic device executes the first control instruction to achieve the first function.

Preferably, the first electronic device is the input means of the second electronic device.

Preferably, the first control instruction is the instruction for controlling the display parameters of a first information, wherein, the first information is the information inputted by the first electronic device.

Preferably, when the first rotation information is the information indicating that the first electronic device rotates counter-clockwise, the first control instruction is the instruction for controlling the display unit of the second electronic device to be unlocked.

Preferably, when the first rotation information is the information indicating that the first electronic device rotates clockwise, the first control instruction is the instruction for enlarging a first display object displayed on the display unit of the second electronic device.

In another aspect, according to anther embodiment of the preset application, there is provided an information processing method applied in a second electronic device which can perform a data transmission with a first electronic device, characterized in that, the method comprises: acquiring a first rotation information sent by the first electronic device, wherein, the first rotation information is acquired through detecting the rotation of the first electronic device by a first detecting unit in the first electronic device; acquiring a first control instruction corresponding to the first rotation information based on the relationship between the preset rotation information and the control instruction; executing the first control instruction to control the second electronic device to achieve a first function corresponding to the first control instruction.

Preferably, acquiring the first control instruction corresponding to the first rotation information specifically comprises: reading an instruction list stored in the second electronic device; acquiring the first control instruction corresponding to the first rotation information based on the instruction list.

Preferably, the first electronic device is the input means of the second electronic device.

Preferably, the first control instruction is the instruction for controlling the display parameters of a first information, wherein, the first information is the information inputted by the first electronic device.

Preferably, when the first rotation information is the information indicating that the first electronic device rotates counter-clockwise, the first control instruction is the instruction for controlling the display unit of the second electronic device to be unlocked.

Preferably, when the first rotation information is the information indicating that the first electronic device rotates clockwise, the first control instruction is the instruction for enlarging a first display object displayed on the display unit of the second electronic device.

In another aspect, according to anther embodiment of the preset application, there is provided an electronic device which can perform a data transmission with a second electronic device, characterized in that, the electronic device comprises: a circuit board; a first detecting unit connected to the circuit board for detecting the rotation of the electronic device to acquire a first rotation information; a first control unit provided on the circuit board and connected to the first detecting unit for determining a first control instruction corresponding to the first rotation information based on the relationship between the preset rotation information and the control instruction, wherein the first control instruction is provided to the second electronic device to be executed.

Preferably, the electronic device further comprises a first switch unit for controlling the first detecting unit to be an enabled state.

Preferably, the electronic device further comprises a second control unit for generating a second control instruction when the first switch unit controls the first detecting unit to be an enabled state, wherein the second control instruction is used to control the first detecting unit to detect the rotation of the electronic device.

Preferably, the first control unit specifically comprises: a first reading subunit for reading an instruction list stored in the electronic device; a first control subunit for acquiring a first control instruction corresponding to the first rotation information based on the instruction list; a first sending subunit for sending the first control instruction to the second electronic device so that the second electronic device executes the first control instruction to achieve the first function.

Preferably, the electronic device is the input means of the second electronic device.

Preferably, the first control instruction is the instruction for controlling the display parameters of a first information, wherein, the first information is the information inputted by the electronic device.

Preferably, when the first rotation information is the information indicating that the electronic device rotates counter-clockwise, the first control instruction is the instruction for controlling the display unit of the second electronic device to be unlocked.

Preferably, when the first rotation information is the information indicating that the electronic device rotates clockwise, the first control instruction is the instruction for enlarging a first display object displayed on the display unit of the second electronic device.

In another aspect, according to anther embodiment of the preset application, there is provided An electronic device which can perform a data transmission with a first electronic device, characterized in that, the electronic device comprises: a circuit board; a first receiving unit provided on the circuit board for acquiring a first rotation information sent by the first electronic device, wherein, the first rotation information is acquired through detecting the rotation of the first electronic device by a first detecting unit in the first electronic device; a first control unit provided on the circuit board and connected to the first receiving unit for acquiring a first control instruction corresponding to the first rotation information based on the relationship between the preset rotation information and the control instruction, and for executing the first control instruction to control the electronic device to achieve the first function corresponding to the first control instruction.

Preferably, the first control unit specifically comprises: a first acquiring unit for acquiring the first control instruction corresponding to the first rotation information based on the relationship between the preset rotation information and the control instruction; a second control unit for executing the first control instruction to control the electronic device to achieve the first function corresponding to the first control instruction.

Preferably, the first acquiring unit specifically comprises: a first reading subunit for reading the instruction list stored in the electronic device; a first acquiring subunit for acquiring the first control instruction corresponding to the first rotation information based on the instruction list.

Preferably, the first electronic device is the input means of the electronic device.

Preferably, the first control instruction is the instruction for controlling the display parameters of a first information, wherein, the first information is the information inputted by the first electronic device.

Preferably, when the first rotation information is the information indicating that the first electronic device rotates counter-clockwise, the first control instruction is the instruction for controlling the display unit of the electronic device to be unlocked.

Preferably, when the first rotation information is the information indicating that the first electronic device rotates clockwise, the first control instruction is the instruction for enlarging a first display object displayed on the display unit of the electronic device.

According to the technical solutions in the above embodiments of the present application, there are the technical effects or advantages as follow:

1. Since the first detecting unit is provided on the first electronic device, when the user operates the second electronic device using the first electronic device, it is possible to acquire the first rotation information through detecting the rotation of the first electronic device by the first detecting unit, then acquire the first control instruction according to the first rotation information so as to operate the second electronic device. The technical problem existing in the prior art that the stylus cannot operate the electronic device via other operation manner is solved effectively, thus it is possible to operate the second electronic device through the rotation operation of the first electronic device, a new way of operation is provided to operate the second electronic device.

2. Since the first detecting unit is provided on the first electronic device, when the user operates the second electronic device using the first electronic device, it is possible to acquire the first rotation information through detecting the rotation of the first electronic device by the first detecting unit, then acquire the first control instruction according to the first rotation information so as to operate the second electronic device, but not operate the second electronic device according to the touch position on the screen of the second electronic device by the first electronic device. Thus, it is possible for the first electronic device to operate the second electronic device even in the case that it does not touch the second electronic device directly so as to avoid damaging the screen due to a long time touch on the screen by the first electronic device.

3. Since the first electronic device comprises the first switch unit, when the user needs to control the second electronic device by rotating the first electronic device, the first switch unit is controlled to be enabled to detect the rotation of the first electronic device, thus a misoperation on the second electronic device due to rotating the first electronic device is avoided when there is no need to operate the second electronic device by rotating the first electronic device.

DETAILED DESCRIPTION

An embodiment of the present invention provides an information processing method and an electronic device, which solves the technical problem of the prior art that the stylus cannot operate the electronic device via other operation manner.

The embodiment of the present invention aims to solve the above-mentioned technical problem that the stylus cannot operate the electronic device via other operation manner, and the concept thereof is as follows:

A first electronic device is provided with a first detecting unit, by which the rotation of the first electronic device is detected; then, a first control instruction corresponding to a first rotation information is determined according to the relationship between the preset rotation information and the control instruction, and the first control instruction is sent to a second electronic device, so that the second electronic device performs the first control instruction to achieve a first function. Thus, it is possible for the first electronic device to operate the second electronic device via its rotation, furthermore, a novel operation way to operate the second electronic device is provided.

For a better understanding of the technical solutions, the technical solutions will be described in detail with reference to the appended drawings and the embodiments.

An embodiment of the present invention provides an electronic device which can perform a data transmission with a second electronic device. In a specific implementing process, the electronic device may be the input means of the second electronic device, for example the electronic device is a stylus and the second electronic device is a tablet computer; the electronic device is a gamepad and the second electronic device is a desktop computer; the electronic device and the second electronic device of course can be any other electronic device, and the present application is not limited thereto.

Figure 1:
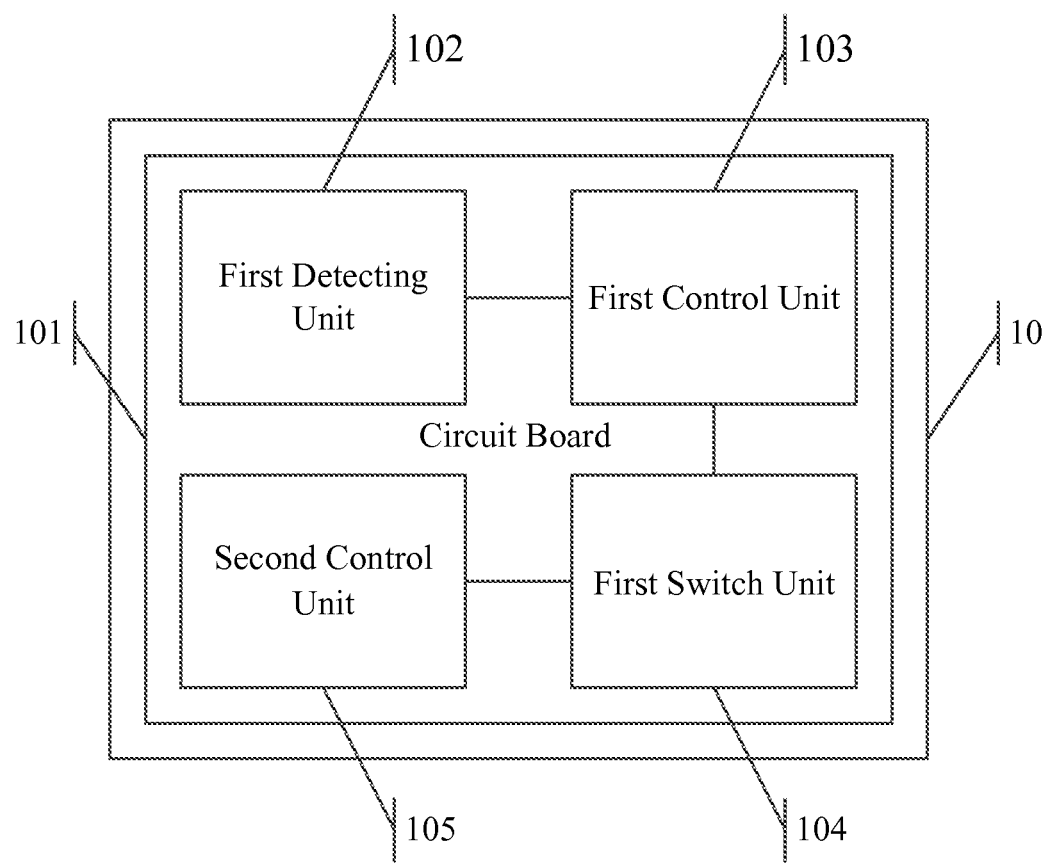
FIG. 1 is a structure schematic diagram of the electronic device according to an embodiment of the present application.

As shown in FIG. 1, the electronic device 10 comprises: a circuit board 101; a first detecting unit 102 connected to the circuit board 101 for detecting the rotation of the electronic device 10 to acquire a first rotation information; a first control unit 103 provided on the circuit board 101 and connected to the first detecting unit 102 for determining a first control instruction corresponding to the first rotation information based on the relationship between the preset rotation information and the control instruction, wherein the first control instruction is provided to a second electronic device to be executed.

In the specific embodiments, the first detecting unit 102 possesses many kinds of forms.

In a first form, the first detecting unit 102 can be an angle sensor or a gyroscope. Thus, the first detecting unit 102 can directly acquire the first rotation information based on the rotation of the electronic device 10. When the first detecting unit 102 is an angle sensor, since the counter of the angle sensor increments the count value by one in case that the first electronic device rotates in one direction, and the counter of the angle sensor decrements the count value by one in case that the first electronic device rotates in an opposite direction, thus the angle sensor can acquire the first rotation information according to the count value of the counter. For example, the count value is incremented by one, which indicates that the first electronic device rotates clockwise, and the count value is decremented by one, which indicates that the first electronic device rotates counter-clockwise. When the first detecting unit 102 is a gyroscope, since there is a deflection angle between the initial rotation shaft before rotation and the rotation shaft after rotation, the gyroscope can acquire the first rotation information according to the deflection angle. For example, the deflection angle is positive, which indicates that the first electronic device rotates clockwise; otherwise, the first electronic device rotates counter-clockwise.

In the specific embodiment, the angle sensor can also be set so that the count value is incremented by one, which indicates that the first electronic device rotates counter-clockwise, and the count value is decremented by one, which indicates that the first electronic device rotates clockwise; the gyroscope can also be set so that the deflection angle is negative, which indicates that the first electronic device rotates clockwise; otherwise, the first electronic device rotates counter-clockwise. Those skilled in the art can set the rule by themselves, and the present application is not limited thereto.

Figure 2:
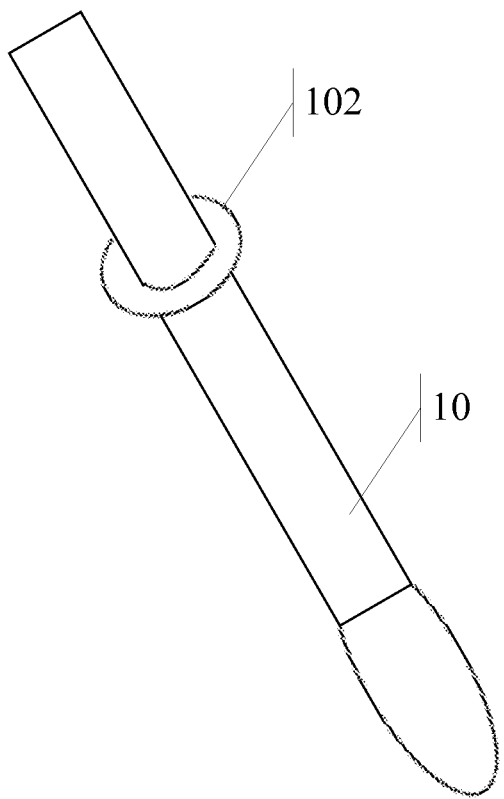
FIG. 2 is a structure diagram of the electronic device according to an embodiment of the present application.

In a second form, the first detecting unit 102 can be a wheel provided on the electronic device 10, and the rotation of the wheel corresponds to the rotation of the electronic device 10, thus the first rotation information can be acquired by detecting the rotation of the wheel. For example, the electronic device 10 is a stylus as shown in FIG. 2, and the above-mentioned roller protrudes out of the penholder of the stylus like a mouse wheel, so that the user can touch and move the wheel. When the user moves the wheel, like the mouse, the electronic device 10 can determine the rotation direction of the wheel according to the count value of the counter of two optical coupling sensors on the two sides of the wheel, and take the rotation state of the wheel as that of the electronic device 10 so as to generate the first rotation information. When the user moves the wheel clockwise, the count value of the counter of the optical coupling sensor on right side of the wheel is incremented by one. When the user moves the wheel counter-clockwise, the count value of the counter of the optical coupling sensor on left side of the wheel is incremented by one. For example, the count value of the counter of the optical coupling sensor on right side of the wheel is incremented by one to acquire the first rotation information indicating that the wheel is moved clockwise.

Furthermore, the electronic device 10 can also rotate counter-clockwise, and the detecting process performed by the first detecting unit 102 is the same as the case that the electronic device 10 rotates clockwise, the repeated explanation is omitted here.

Furthermore, to avoid a misoperation when the electronic device 10 rotates in the case that there is no need to use the first detecting unit 102, the electronic device 10 further comprises a first switch unit 104 to control the first detecting unit 102 to be an enabled state.

In the specific embodiment, the first switch unit 104 can be a mechanical button, when the user wants to detect the rotation state of the electronic device 10 using the first detecting unit 102, the user presses the first switch unit 104 so that the first detecting unit 102 is enabled to work; when there is no need for the user to detect the rotation state of the electronic device 10 using the first detecting unit 102, the user presses the first switch unit 104 again so that the first detecting unit 102 is disabled. Absolutely, the first switch unit 104 can also be an electromagnetic relay, and those skilled in the art can set it and the present application is not limited thereto.

Furthermore, the electronic device 10 further comprise a second control unit 105 for generating a second control instruction when the first switch unit 104 controls the first detecting unit 102 to be an enabled state, wherein the second control instruction is used to control the first detecting unit 102 to detect the rotation of the electronic device 10.

Furthermore, the first detecting unit 102 comprises: a first reading subunit for reading the instruction list stored in the electronic device 10; a first control subunit for acquiring the first control instruction corresponding to the first rotation information based on the instruction list; a first sending subunit for sending the first control instruction to the second electronic device so that the second electronic device performs the first control instruction to achieve the first function.

The detailed working process of the electronic device 10 will be described in the following embodiments, and the detailed explanation is omitted here.

Base on the same invention concept, the another embodiment of the present invention provides an information processing method applied to a first electronic device which can perform a data transmission with a second electronic device, such as the electronic device 10 in the above technical solution. In a specific embodiment, the electronic device may be the input means of the second electronic device, for example the electronic device is a stylus and the second electronic device is a tablet computer; the electronic device is a gamepad and the second electronic device is a desktop computer; the electronic device and the second electronic device of course can be any other electronic device, and the present application is not limited thereto.

Figure 3:
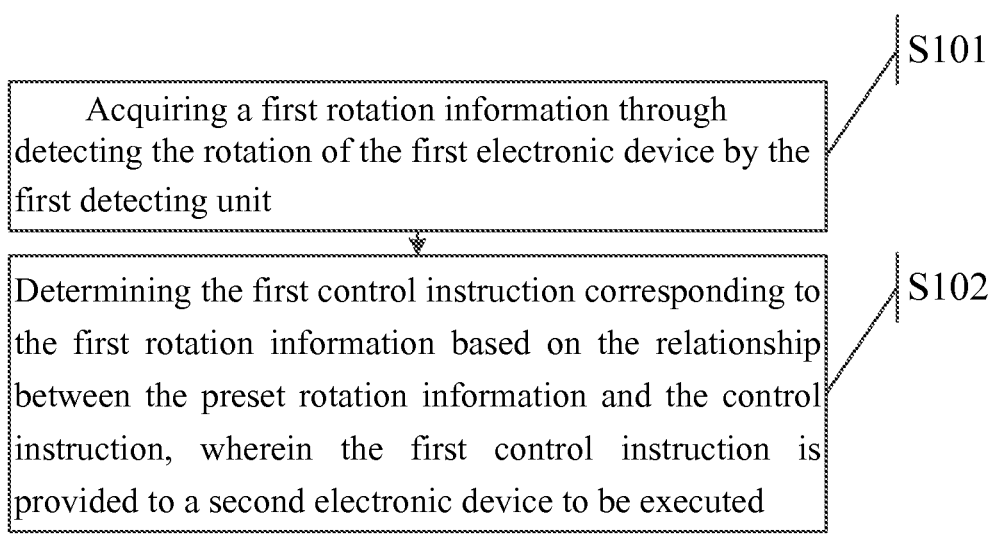
FIG. 3 is a flowchart of the information processing method according to an embodiment of the present application.

As shown in FIG. 3, the method comprises:

Step 101: Detecting the rotation of the first electronic device by the first detecting unit to acquire the first rotation information.

Step 102: Determining the first control instruction corresponding to the first rotation information based on the relationship between the preset rotation information and the control instruction, wherein the first control instruction is provided to a second electronic device to be executed.

Taking the first electronic device being a stylus and the second electronic device being a tablet computer for example, the above solution will be explained in detail.

With reference to FIG. 2 and FIG. 3, when the user needs to operate the second electronic device by using the first electronic device (that is, the stylus), the user can press the first switch unit 104, so that the first detecting unit 102 is enabled. Then, the user rotates the first electronic device (such as a clockwise rotation), and S101 is performed next so as to detect the above-mentioned rotation of the first electronic device by the first detecting unit 102 to acquire the first rotation information, that is, the information indicating that the first electronic device rotates clockwise.

For example, when the first detecting unit 102 is an angle sensor, and the user rotates the first electronic device clockwise, then the count value of the counter of the first detecting unit 102 is incremented by one. At this time, the first rotation information is acquired according to the count value. When the first detecting unit 102 is a gyroscope, and the user rotates the first electronic device clockwise, then the rotation shaft of the first detecting unit 102 will generate a deflection angle (such as 15°). At this time, the first rotation information is acquired. When the first detecting unit 102 is a wheel, and the user rotates the wheel clockwise, then the count value of the counter of the optical coupling sensor on right side of the wheel is incremented by one. At this time, the first rotation information is acquired according to the count value.

In another embodiment, before S101, the method further comprises: when the first switch unit 104 controls the first detecting unit 102 to be an enabled state, a second control is generated, wherein the second control instruction is used to control the first detecting unit 102 to detect the rotation of the electronic device 10.

Specifically, when the first switch unit 104 controls the first detecting unit 102 to be an enabled state, the first detecting unit 102 will receive a second control instruction sent from the second control unit 105 so as to control the first detecting unit 102 to detect the rotation of the electronic device 10.

After acquiring the first rotation information in S101, S102 is to be executed, that is: determining the first control instruction corresponding to the first rotation information based on the relationship between the preset rotation information and the control instruction, wherein the first control instruction is provided to a second electronic device to be executed. The preset rotation information here refers to the rotation direction information of the first electronic device.

Figure 4:
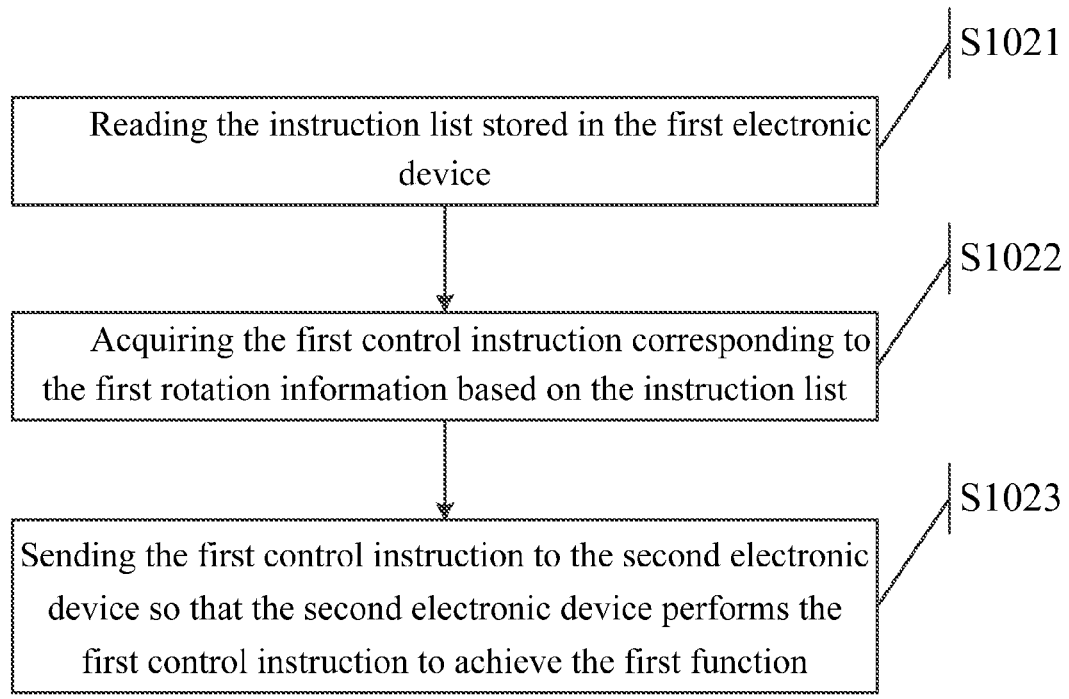
FIG. 4 is a flowchart of the method for obtaining a first control instruction according to an embodiment of the present application.

In the specific embodiment, as shown in FIG. 4, S102 may be as follows:

S1021: Reading the instruction list stored in the first electronic device;

S1022: Acquiring the first control instruction corresponding to the first rotation information based on the instruction list;

S1023: Sending the first control instruction to the second electronic device so that the second electronic device performs the first control instruction to achieve the first function.

Firstly, after the first rotation information is acquired by the first electronic device, S1021 is performed, and the instruction list stored in the storing unit of the first electronic device is read. The instruction list comprises the preset rotation information and the corresponding control instruction, as shown in the following table:

| Preset rotation information | Control instruction |
| --- | --- |
| Clockwise rotation | Enlarge |
| Counter-clockwise rotation | Unlock |

Those skilled in the art will understand that the above table only intends to demonstrate the constitution of the list but not to limit the preset rotation information and the control instruction. In the specific embodiment, the preset rotation information is not limited to the two kinds in the above table, and the corresponding control instruction also is not limited to the two kinds in the above table. The present application is not limited thereto.

Furthermore, in order to provide many kinds of instructions to control the second electronic device, the preset rotation information can also comprise the rotation direction and the number of the cycles of rotation. For example, when the preset rotation information is one cycle of clockwise rotation, the control instruction is "enlarge" instruction; when the preset rotation information is two cycles of clockwise rotation, the control instruction is "lock" instruction. Absolutely, there are many kinds of the preset rotation information, and those skilled in the art can set as needed, the present application is not limited thereto.

Thereafter, S1002 is performed to acquire the first control instruction corresponding to the first rotation information. Specifically, the first rotation information is compared with the preset rotation information to find the preset rotation information consistent with the first rotation information. Then, the corresponding control instruction is found based on the preset rotation information and the control instruction is the first control instruction corresponding to the first rotation information.

For example, the first rotation information is the information indicating that the first electronic device rotates clockwise, then, the preset rotation information indicating that the first electronic device rotates clockwise is found in the instruction list, that is, "Clockwise rotation". Then, according to the preset rotation information "Clockwise rotation", the control instruction corresponding to it is found, that is, "Enlarge" instruction. At this time, the first control instruction corresponding to the first rotation information is the "Enlarge" instruction.

Next, S1023 is performed to send the first control instruction to the second electronic device, so that the second electronic device performs the first control instruction to achieve the first function.

Specifically, after acquiring the first control instruction, the first sending subunit of the first electronic device will send the first control instruction to the second electronic device, thereafter, the data transmission unit of the second electronic device will send the first control instruction received to the data processing unit of the second electronic device to perform the first control instruction, so that the second electronic device can achieve the first function corresponding to the first control instruction.

In the specific embodiment, the first sending subunit of the first electronic device and the data transmission unit of the second electronic device can be the wireless data transmission means or the near field communication module such as NFC, infrared and Bluetooth. Of course, they can be other data transmission means as long as they can perform the data transmission with the second electronic device, and those skilled in the art can set as needed, the present application is not limited thereto.

In the specific embodiment, the first control instruction can be the instruction for controlling the display parameters of the first information, wherein, the first information is the information inputted by the first electronic device. That is, the first electronic device inputs the first information such as a word or a graph to the second electronic device, then, the display unit of the second electronic device will display the first information. At this time, the first control instruction can be the instruction for controlling the display parameters of the first information, such as for controlling the display size of the word, the thickness of the trace, and the size of a rectangle cutting box.

For example, the first information is a "Word" inputted by the first electronic device, and the size displayed on the second electronic device is font size 4. At this time, if the user wants to display the "Word" in font size 2, a first control instruction will be generated by the first electronic device through the above steps and sent to the second electronic device. Then, the second electronic device performs the first control instruction, so that the "Word" is enlarged to be displayed in font size 2, that is, the first function is achieved.

Absolutely, the first control instruction can also be other instructions, such as, an unlock instruction, a page turning instruction, and those skilled in the art can set as needed, the present application is not limited thereto.

The information processing method of the present application will be explained with reference to the following detailed embodiments, and the following embodiments mainly introduce several possible application scenes of the control method. What should be noted is that the embodiments of the invention only intend to explain the invention, and not to limit the invention. The embodiments conforming to the spirit of the invention are all within the protection scope of the invention, and those skilled in the art naturally understand how to alter according to the gist of the invention.

The First Embodiment

The first electronic device is a stylus, and the second electronic device is a tablet computer. When the user is drawing on the screen of the second electronic device by using the first electronic device, the user needs to choose the thickness of the trace to adjust the thickness of the line drawn on the second electronic device by the first electronic device. For example, the user is currently using the line with the thickness of 0.75 point, firstly, the user presses the first switch unit 104, then rotates the first electronic device clockwise, the first detecting unit 102 will detect the action of the first electronic device to generate the first rotation information and send the first rotation information to the first control unit 103. Then, the first control unit 103 will compare the first rotation information with the preset rotation information in the instruction list stored in the first electronic device to find out the "Clockwise rotation" information consistent with the first rotation information, and further acquire the first control instruction corresponding to "Clockwise rotation", that is, "Bold instruction". Next, the wireless data transmission unit of the first electronic device sends the first control instruction to the second electronic device, and the second electronic device receives the instruction and controls the line to be bolder such as the line with the thickness of 1 point. Thus, the thickness of the line to be drawn by the user will be 1 point.

The Second Embodiment

The first electronic device is a stylus, and the second electronic device is a tablet computer. When the user is inputting text on the screen of the second electronic device by using the first electronic device, the user needs to choose the font size to adapt different reading requirements of the user. For example, the user is currently using the font size 4, firstly, the user presses the first switch unit 104, and then rotates the first electronic device clockwise, the first detecting unit 102 will detect the action of the first electronic device to generate the first rotation information and send the first rotation information to the first control unit 103. Then, the first control unit 103 will compare the first rotation information with the preset rotation information in the instruction list stored in the first electronic device to find out the "Clockwise rotation" information consistent with the first rotation information, and further acquire the first control instruction corresponding to "Clockwise rotation", that is, "Enlarge font size instruction". Next, the wireless data transmission unit of the first electronic device sends the first control instruction to the second electronic device, and the second electronic device receives and performs the instruction to increment the font size of the displayed text by one, so that the displayed text is adjusted from font size 4 to font size 3. Thus, the text to be input by the user will be displayed on the second electronic device in font size 3.

The Third Embodiment

The first electronic device is a stylus, and the second electronic device is a tablet computer. When the second electronic device is in the lock state, the user wants to unlock as so to use the second electronic device. The user presses the first switch unit 104 to enable the first detecting unit 102, and then rotates the first electronic device counter-clockwise, the first detecting unit 102 will detect the action of the first electronic device to generate the first rotation information and send the first rotation information to the first control unit 103. Then, the first control unit 103 will compare the first rotation information with the preset rotation information in the instruction list stored in the first electronic device to find out the "Counter-clockwise rotation" information consistent with the first rotation information, and further acquire the first control instruction corresponding to "Counter-clockwise rotation", that is, "Unlock instruction". Next, the wireless data transmission unit of the first electronic device sends the first control instruction to the second electronic device, and the second electronic device receives and performs the instruction to control the second electronic device to be unlocked, so that the user can user the second electronic device normally.

In the above one or more embodiments, the operation performed on second electronic device is achieved through the first detecting unit 102 detecting the action of a clockwise rotation of the first electronic device. Thus, a new way of operation is provided for the first electronic device to operate the second electronic device. Further, by way of controlling the first detecting unit 102 through the first switch unit 104, it is possible to enable the first detecting unit 102 only when the user wants to control the second electronic device by the first electronic device as so to avoid a misoperation on the second electronic device due to rotating the first electronic device when there is no need to control the second electronic device by the first electronic device.

Based on the same invention concept, another embodiment of the invention provides an electronic device, and the electronic device is a tablet computer, a notebook computer or a desktop computer; the electronic device is capable of performing a data transmission with the first electronic device such as the electronic device 10. In the specific embodiment, the first electronic device may be the input means of the electronic device, for example the electronic device is a tablet computer and the first electronic device is a stylus; the electronic device is a desktop computer and the first electronic device is a gamepad; the electronic device and the first electronic device of course can be any other electronic device, and the present application is not limited thereto.

Figure 5:
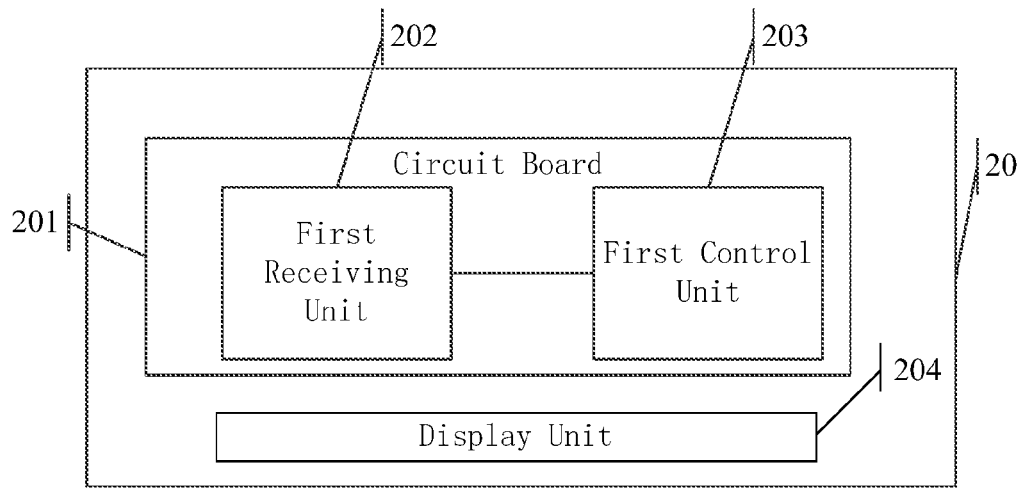
FIG. 5 is a structure schematic diagram of the electronic device according to an embodiment of the present application.

As shown in FIG. 5, the electronic device 20 comprise: a circuit board 201; a first receiving unit 202 provided on the circuit board 201 for acquiring the first rotation information sent by the first electronic device, wherein, the first rotation information is acquired through detecting the rotation of the first electronic device by the first detecting unit in the first electronic device; a first control unit 203 provided on the circuit board 201 and connected to the first receiving unit 202 for acquiring a first control instruction corresponding to the first rotation information based on the relationship between the preset rotation information and the control instruction, and for performing the first control instruction to control the electronic device 20 to achieve the first function corresponding to the first control instruction.

In the specific embodiment, the first receiving unit 202 can be the wireless data transmission means or the near field communication module such as NFC, infrared and Bluetooth. Of course, it can be other data transmission means as long as it can receive the first rotation information sent by the first electronic device, and those skilled in the art can set as needed, the present application is not limited thereto.

Furthermore, the first control unit 203 specifically comprises: a first acquiring unit for acquiring the first control instruction corresponding to the first rotation information based on the relationship between the preset rotation information and the control instruction; a second control unit for performing the first control instruction to control the electronic device 20 to achieve the first function corresponding to the first control instruction.

Furthermore, the first acquiring unit specifically comprises: a first reading subunit for reading the instruction list stored in the electronic device; a first acquiring subunit for acquiring a first control instruction corresponding to the first rotation information based on the instruction list.

The detailed working process of the electronic device 20 will be described in the following embodiments, and the detailed explanation is omitted here.

Base on the same invention concept, the another embodiment of the present invention provides an information processing method applied to a second electronic device such as the electronic device 20 which can perform a data transmission with a first electronic device such as the electronic device 10. In a specific embodiment, the first electronic device may be the input means of the second electronic device, for example the first electronic device is a stylus and the second electronic device is a tablet computer; the first electronic device is a gamepad and the second electronic device is a desktop computer; the first electronic device and the second electronic device of course can be any other electronic device, and the present application is not limited thereto.

Figure 6:
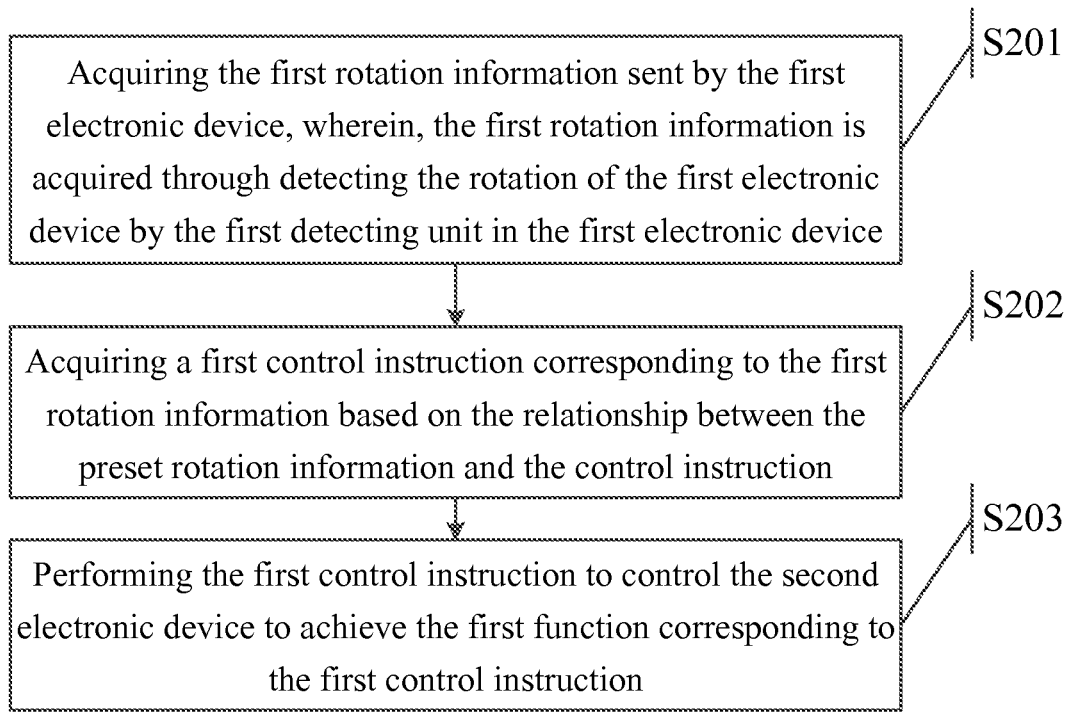
FIG. 6 is a flowchart of the information processing method according to an embodiment of the present application.

As shown in FIG. 6, the method comprises:

S201: Acquiring the first rotation information sent by the first electronic device, wherein, the first rotation information is acquired by detecting the rotation of the first electronic device through the first detecting unit in the first electronic device;

S202: Acquiring a first control instruction corresponding to the first rotation information based on the relationship between the preset rotation information and the control instruction;

S203: Performing the first control instruction to control the second electronic device to achieve the first function corresponding to the first control instruction.

Taking the first electronic device being a stylus and the second electronic device being a tablet computer for example, the above solution will be explained in detail.

With reference to FIG. 5 and FIG. 6, for example, when the user needs to operate the second electronic device (that is, the tablet computer) by using the first electronic device, the user can press the first switch unit 104 of the first electronic device, so that the first detecting unit 102 is enabled. Then, the user rotates the first electronic device (such as a clockwise rotation), and the first detecting unit 102 acquires the rotation information of the first electronic device, that is, the first rotation information, and sends it to the second electronic device. S201 is performed next to acquire the first rotation information, that is, the information indicating the first electronic device rotating clockwise.

After acquiring the first rotation information, S202 is to be executed, that is: acquiring a first control instruction corresponding to the first rotation information based on the relationship between the preset rotation information and the control instruction. The preset rotation information here refers to the rotation direction information of the first electronic device.

Figure 7:
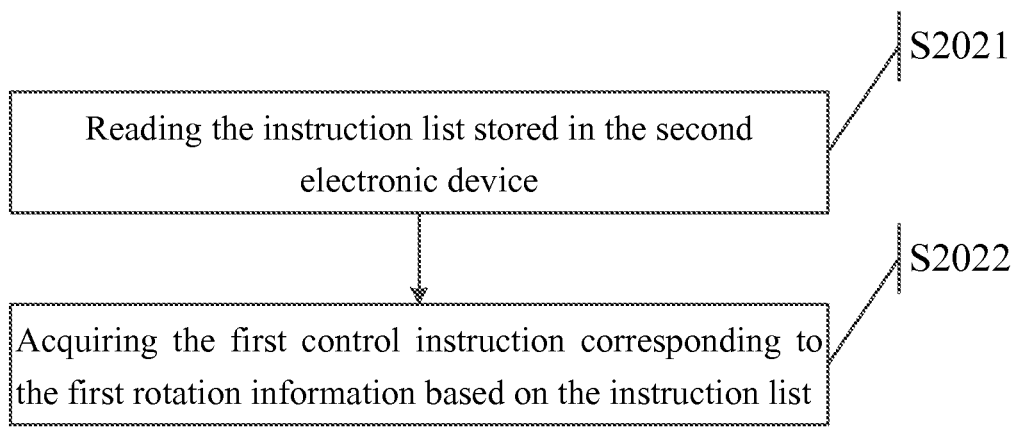
FIG. 7 is a flowchart of the method for obtaining a first control instruction according to an embodiment of the present application.

In the specific embodiment, as shown in FIG. 7, S202 may be as follows:

S2021: Reading the instruction list stored in the second electronic device;

S2022: Acquiring the first control instruction corresponding to the first rotation information based on the instruction list.

Firstly, after the first rotation information is acquired by the second electronic device, S2021 is performed, and the instruction list stored in the storing unit of the first electronic device is read by the first reading subunit. The instruction list comprises the preset rotation information and the corresponding control instruction, as shown in the following table:

| Preset rotation information | Control instruction |
|---|---|
| Clockwise rotation | Enlarge |
| Counter-clockwise rotation | Unlock |

Those skilled in the art will understand that the above table only intends to demonstrate the constitution of the list but not to limit the preset rotation information and the control instruction. In the specific embodiment, the preset rotation information is not limited to the two kinds in the above table, and the corresponding control instruction also is not limited to the two kinds in the above table. The present application is not limited thereto.

Furthermore, in order to provide many kinds of instructions to control the second electronic device, the preset rotation information can also comprise the rotation direction and the number of the cycles of rotation. For example, when the preset rotation information is one cycle of clockwise rotation, the control instruction is "enlarge" instruction; when the preset rotation information is two cycles of clockwise rotation, the control instruction is "lock" instruction. Absolutely, there are many kinds of the preset rotation information, and those skilled in the art can set as needed, the present application is not limited thereto.

Thereafter, S2022 is performed, that is: acquiring the first control instruction corresponding to the first rotation information. Specifically, the first acquiring subunit compares the first rotation information with the preset rotation information to find the preset rotation information consistent with the first rotation information. Then, the corresponding control instruction is found based on the preset rotation information and the control instruction is the first control instruction corresponding to the first rotation information.

For example, the first rotation information is the information indicating that the first electronic device rotates clockwise, then, the preset rotation information indicating that the first electronic device rotates clockwise is found in the instruction list, that is, "Clockwise rotation". Then, according to the preset rotation information "Clockwise rotation", the control instruction corresponding to it is found, that is, "Enlarge" instruction. At this time, the first control instruction corresponding to the first rotation information is the "Enlarge" instruction.

After acquiring the first control instruction in S202, S203 is performed, that is: performing the first control instruction to control the second electronic device to achieve the first function corresponding to the first control instruction.

In the specific embodiment, the first control instruction can be the instruction for controlling the display parameters of the first information, wherein, the first information is the information inputted by the first electronic device. That is, the first electronic device inputs the first information such as a word or a graph to the second electronic device, then, the display unit of the second electronic device will display the first information. At this time, the first control instruction can be the instruction for controlling the display parameters of the first information, such as for controlling the display size of the word, the thickness of the trace, and the size of a rectangle cutting box.

For example, the first information is a "Word" inputted by the first electronic device, and the size displayed on the second electronic device is font size 4. At this time, if the user wants to display the "Word" in font size 2, a first control instruction will be generated by the first electronic device through the above steps and sent to the second electronic device. Then, the second electronic device performs the first control instruction, so that the "Word" is enlarged to be displayed in font size 2, that is, the first function is achieved.

Absolutely, the first control instruction can also be other instructions, such as, an unlock instruction, a page turning instruction, and those skilled in the art can set as needed, the present application is not limited thereto.

In the above one or more embodiments, the second electronic device receives the first rotation information sent by the first electronic device, and then acquires the corresponding first control instruction based on the first rotation information to execute the first control instruction, so that the second electronic device can achieve the first function. Thus, a new way of operation is provided for the first electronic device to operate the second electronic device.

According to the technical solutions in the above embodiments of the present application, there are the technical effects or advantages as follow:

1. Since the first detecting unit is provided on the first electronic device, when the user operates the second electronic device using the first electronic device, it is possible to acquire the first rotation information through detecting the rotation of the first electronic device by the first detecting unit, then acquire the first control instruction according to the first rotation information so as to operate the second electronic device. The technical problem existing in the prior art that the stylus cannot operate the electronic device via other operation manner is solved effectively, thus it is possible to operate the second electronic device through the rotation operation of the first electronic device, a new way of operation is provided to operate the second electronic device.

2. Since the first detecting unit is provided on the first electronic device, when the user operates the second electronic device using the first electronic device, it is possible to acquire the first rotation information through detecting the rotation of the first electronic device by the first detecting unit, then acquire the first control instruction according to the first rotation information so as to operate the second electronic device, but not operate the second electronic device according to the touch position on the screen of the second electronic device by the first electronic device. Thus, it is possible for the first electronic device to operate the second electronic device even in the case that it does not touch the second electronic device directly so as to avoid damaging the screen due to a long time touch on the screen by the first electronic device.

3. Since the first electronic device comprises the first switch unit, when the user needs to control the second electronic device by rotating the first electronic device, the first switch unit is controlled to be enabled to detect the rotation of the first electronic device, thus a misoperation on the second electronic device due to rotating the first electronic device is avoided when there is no need to operate the second electronic device by rotating the first electronic device.

As will be appreciated by one skilled in the art, the embodiments of the present invention may be embodied as a system, method or computer program product. Accordingly, aspects of the present invention may take the form of an entirely hardware embodiment, an entirely software embodiment or an embodiment combining software and hardware aspects. Furthermore, the present invention may take the form of a computer program product embodied in one or more computer readable medium(s) having computer readable program code embodied thereon.

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing method applied in a first electronic device which can perform a data transmission with a second electronic device comprising:
   acquiring a first rotation information through detecting a rotation of the first electronic device by a first detecting unit; and,
   determining a first control instruction corresponding to the first rotation information based on a relationship between preset rotation information and a control instruction, wherein the first control instruction is provided to the second electronic device to be executed,
   wherein the first electronic device further comprises a first switch unit for controlling the first detecting unit to be an enabled state, and
   wherein before acquiring a first rotation information through detecting the rotation of the first electronic device by the first detecting unit, the method comprises generating a second control instruction when the first switch unit controls the first detecting unit to be an enabled state, wherein the second control instruction is used to control the first detecting unit to detect the rotation of the electronic device.

2. The method according to claim 1, wherein determining the first control instruction corresponding to the first rotation information comprises:
   reading an instruction list stored in the first electronic device;
   acquiring the first control instruction corresponding to the first rotation information based on the instruction list; and
   sending the first control instruction to the second electronic device so that the second electronic device executes the first control instruction to achieve a first function.

3. The method according to claim 1, wherein the first electronic device is an input means of the second electronic device.

4. The method according to claim 3, wherein the first control instruction is an instruction for controlling display parameters of a first information and the first information is the information inputted by the first electronic device.

5. The method according to claim 1, wherein when the first rotation information is the information indicating that the first electronic device rotates counter-clockwise, the first control instruction is the instruction for controlling a display unit of the second electronic device to be unlocked.

6. The method according to claim 1, wherein when the first rotation information is the information indicating that the first electronic device rotates clockwise, the first control instruction is the instruction for enlarging a first display object displayed on a display unit of the second electronic device.

7. An information processing method applied in a second electronic device which can perform a data transmission with a first electronic device comprising:
   acquiring a first rotation information sent by the first electronic device, wherein, the first rotation information is acquired through detecting a rotation of the first electronic device by a first detecting unit in the first electronic device;

acquiring a first control instruction corresponding to the first rotation information based on the relationship between preset rotation information and a control instruction; and executing a first control instruction to control the second electronic device to achieve a first function corresponding to the first control instruction, wherein acquiring the first control instruction corresponding to the first rotation information comprises:

reading an instruction list stored in the second electronic device; and acquiring the first control instruction corresponding to the first rotation information based on the instruction list.

8. The method according to claim 7, wherein the first electronic device is an input means of the second electronic device.

9. The method according to claim 8, wherein the first control instruction is an instruction for controlling display parameters of a first information and the first information is the information inputted by the first electronic device.

10. The method according to claim 7, wherein when the first rotation information is the information indicating that the first electronic device rotates counter-clockwise, the first control instruction is the instruction for controlling a display unit of the second electronic device to be unlocked.

11. The method according to claim 7, wherein when the first rotation information is the information indicating that the first electronic device rotates clockwise, the first control instruction is the instruction for enlarging a first display object displayed on a display unit of the second electronic device.

12. An electronic device which can perform a data transmission with a second electronic device, characterized in that comprising:

a circuit board;

a first detecting unit connected to the circuit board for detecting a rotation of the electronic device to acquire a first rotation information; and a first control unit provided on the circuit board and connected to the first detecting unit for determining a first control instruction corresponding to the first rotation information based on a relationship between preset rotation information and a control instruction, wherein the first control instruction is provided to the second electronic device to be executed, a first switch unit for controlling the first detecting unit to be an enabled state; and a second control unit for generating a second control instruction when the first switch unit controls the first detecting unit to be an enabled state, wherein the second control instruction is used to control the first detecting unit to detect the rotation of the electronic device.

13. The electronic device according to claim 12, wherein the first control unit comprises:

a first reading subunit for reading an instruction list stored in the electronic device;

a first control subunit for acquiring a first control instruction corresponding to the first rotation information based on the instruction list; and a first sending subunit for sending the first control instruction to the second electronic device so that the second electronic device executes the first control instruction to achieve a first function.

14. The electronic device according to claim 12, wherein the electronic device is an input means of the second electronic device.

15. The electronic device according to claim 14, wherein the first control instruction is instruction for controlling display parameters of a first information and the first information is the information inputted by the electronic device.

16. The electronic device according to claim 12, wherein when the first rotation information is the information indicating that the electronic device rotates counter-clockwise, the first control instruction is the instruction for controlling a display unit of the second electronic device to be unlocked.

17. The electronic device according to claim 12, wherein when the first rotation information is the information indicating that the electronic device rotates clockwise, the first control instruction is the instruction for enlarging a first display object displayed on a display unit of the second electronic device.

18. An electronic device which can perform a data transmission with a first electronic device comprising:

a circuit board;

a first receiving unit provided on the circuit board for acquiring a first rotation information sent by the first electronic device, wherein, the first rotation information is acquired through detecting a rotation of the first electronic device by a first detecting unit in the first electronic device; and, a first control unit provided on the circuit board and connected to the first receiving unit for acquiring a first control instruction corresponding to the first rotation information based on a relationship between preset rotation information and a control instruction, and for executing the first control instruction to control the electronic device to achieve a first function corresponding to the first control instruction, wherein the first control unit comprises:

a first acquiring unit for acquiring the first control instruction corresponding to the first rotation information based on the relationship between the preset rotation information and the control instruction;

a second control unit for executing the first control instruction to control the electronic device to achieve the first function corresponding to the first control instruction.

19. The electronic device according to claim 18, wherein the first acquiring unit comprises:

a first reading subunit for reading an instruction list stored in the electronic device; and, a first acquiring subunit for acquiring the first control instruction corresponding to the first rotation information based on the instruction list.

20. The electronic device according to claim 18, wherein the first electronic device is an input means of the electronic device.

21. The electronic device according to claim 18, wherein the first control instruction is an instruction for controlling display parameters of a first information and the first information is the information inputted by the first electronic device.

22. The electronic device according to claim 18, wherein when the first rotation information is the information indicating that the first electronic device rotates counter-clockwise, the first control instruction is the instruction for controlling a display unit of the electronic device to be unlocked.

23. The electronic device according to claim 18, wherein when the first rotation information is the information indicating that the first electronic device rotates clockwise, the first control instruction is the instruction for enlarging a first display object displayed on a display unit of the electronic device.

* * * * *